INVENTORS
DIDIER COSTES
JEAN CLAUDE JACQUIN

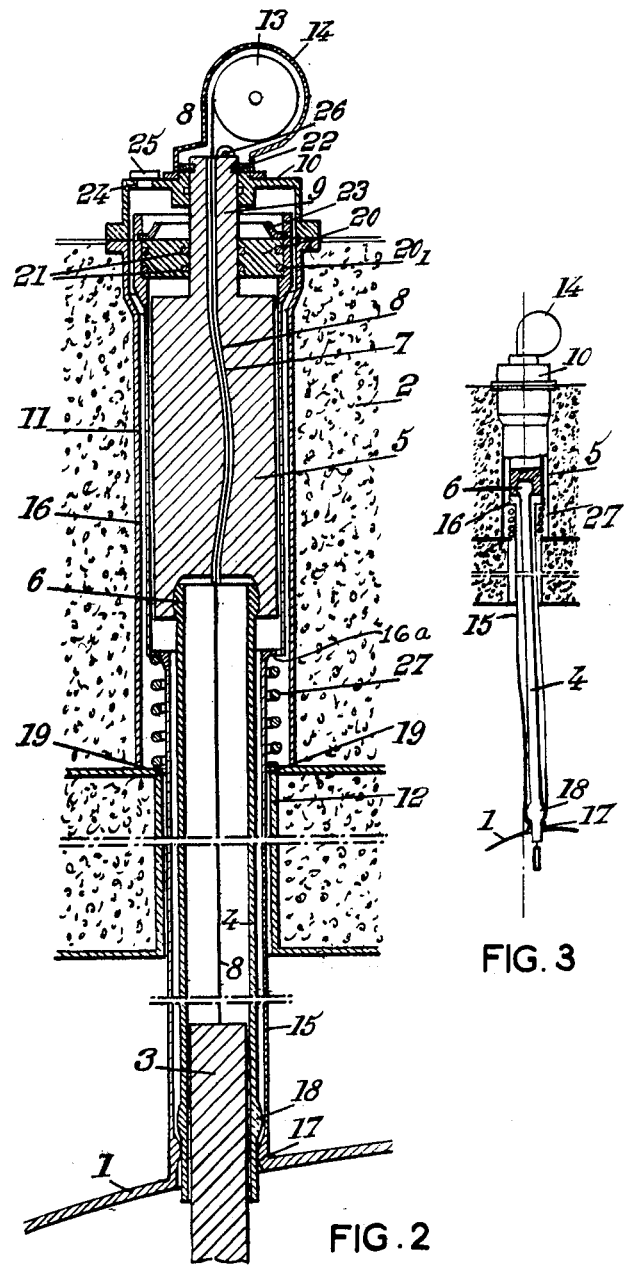

United States Patent Office 3,243,353
Patented Mar. 29, 1966

3,243,353
FLUID-TIGHT ACCESS MEANS FOR A
NUCLEAR REACTOR
Didier Costes, 137 Ave. Victor Hugo, Paris, France, and
Jean-Claude Jacquin, 14 Blvd. Gambetta, Nogent-sur-
Marne, France
Filed Apr. 10, 1962, Ser. No. 186,390
Claims priority, application France, Apr. 10, 1961,
858,265
8 Claims. (Cl. 176—87)

The present invention relates to a device providing a deformable fluid-tight coupling between two structures for the purpose of permitting a mechanical transmission system to pass between two such structures which are liable to carry out slight relative movements, especially between the tank of a reactor and the concrete mass surrounding the said tank, in particular at the point of passage of the control rods.

The chief purpose of the invention is to make these means such that they make it possible to prevent more effectively than has hitherto been the case all abnormal stresses to which certain parts of the structures are subjected as a result of the processes of expansion and creeping of oppositely facing walls and as a result of the operation of the element which makes use of the transmission system.

The present invention will become more readily apparent from a study of the description which follows below, one form of embodiment of the said invention being given therein solely by way of example without implied limitation and shown with reference to the accompanying drawings, in which:

FIG. 2 is a partially diagrammatic view in cross-section of a connecting system between the drive of a control rod and the tank of a nuclear reactor.

FIG. 3 illustrates the same system drawn to a small scale and in a different position and shows the deformation (which has been purposely exaggerated) of certain elements.

Figure 1:
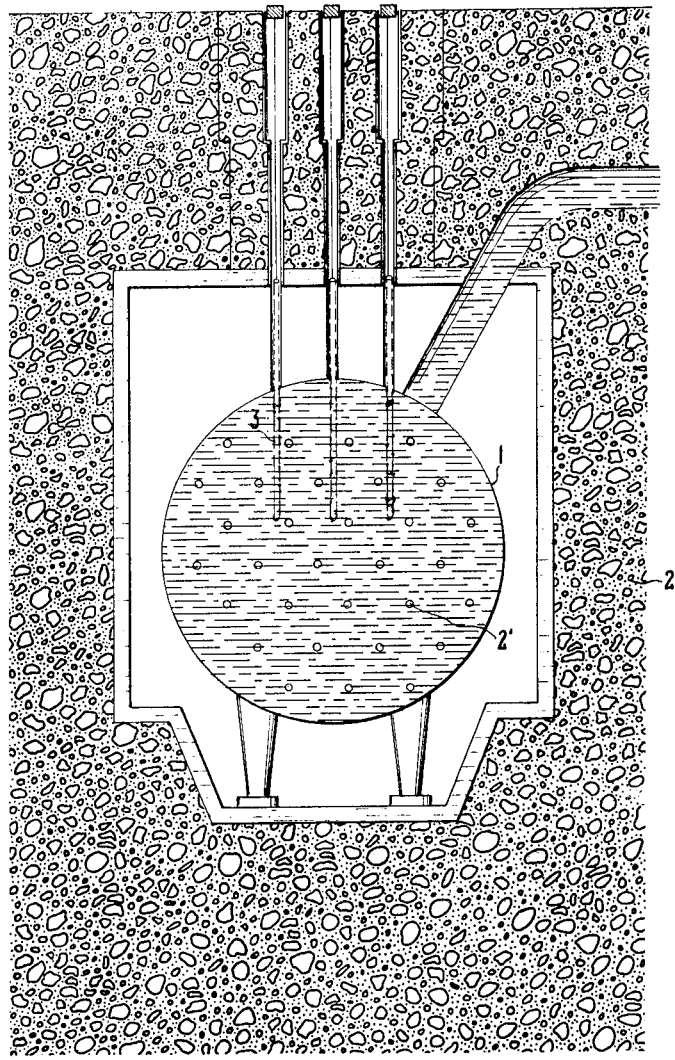
FIG. 1 is a vertical cross-section of a nuclear reactor equipped with a connecting system between the control-rod drive and the tank in accordance with the invention.

The reactor which is shown in FIG. 1 comprises a cylindrical tank 1 located inside a chamber which is disposed inside a biological protection shield constituted by a concrete mass 2. The tank 1 contains a liquid moderator such as heavy water and pressure tubes 2' which pass through the said tank and which are arranged parallel to the longitudinal axis of the latter. The said force tubes carry the fuel elements and are subjected to the pressure of a cooling gas which circulates therein; on the contrary, the tank is only subjected to the hydrostatic pressure of the liquid contained therein.

A series of control rods such as the control rod 3 can be lowered into the tank or they can on the contrary be drawn upwards.

The tank 1 is subject to displacements relatively to the concrete mass as a result of expansion and creeping processes. The control-rod drive which is illustrated in FIGS. 2 and 3 must make allowance for these displacements.

FIG. 2 shows the tank 1 of the reactor and the mass 2 through which it is necessary to connect a control rod 3 to a drive system located outside the mass.

The expedient at present employed for the purpose of providing a passage through the mass 2 consists in the use of operating wells which contain the drive elements and connecting elements such as slideways, winches, jacks, etc. which are coupled at the bottom portion thereof (assuming that the control rods are vertical) in a fluid-tight and generally rigid manner to the tank 1. This solution is subjected to serious limitations, however, on account of the processes of expansion and above all on account of the creeping movements which are effected by the tank relatively to the concrete mass and which frequently act upon the well transversely with respect to the axis of this latter. It accordingly becomes necessary to secure the well only at one end (usually to the tank) and to provide the biological protection or shield at the other end by means of baffle-type devices, which is an imperfect solution. It has also been endeavored to restore the continuity by means of metallic bellows, but this is a costly solution. In any case, it is only with difficulty that these known solutions prevent the tank from being subjected to punching stresses at the point at which the control rod and its guide pass through.

The device which provides a fluid-tight coupling between a first and a second nuclear reactor structure, especially between a fluid-tight tank and a protection mass or shield, and in accordance with the invention, comprises a unit designed for the purpose of guiding a moving member as well as the element which serves for the operation of the said moving member and a sealing-tube which is secured at one end thereof to the first structure and passes through the second structure, characterized in that the sealing-tube has a thin wall which is deformable so as to admit of the relative displacements of the two structures and which is closed at the free end thereof by means of a sealing-off device through which passes an element of the guiding unit, the said guiding unit having a certain degree of freedom relatively to the second structure.

In the form of embodiment which is illustrated in the drawings, the control rod 3 is mounted in the interior of a guide-tube 4 which forms a slideway and the top portion of which is held by a rigid member 5 which is, for example, cylindrical and of larger diameter. The said member 5 forms a plug for the purpose of providing biological protection, and the plug is preferably coupled to the guide-tube 4 by means of a knuckle-joint 6.

The plug 5 is formed with an internal channel 7 which is preferably elbowed and provides a passageway for the rod-operating cable 8; the said plug terminates at the top portion thereof in an extended portion 9 which has a smaller section and is adapted to slide in fluid-tight manner through the cover of the sealing tube which will be described below.

The unit which is constituted by the guide-tube 4 and the plug 5 is suspended by the top portion thereof, the extended portion 9 being for example suspended from a bell cap 10 which closes the passage-tube 11, 12 provided in the concrete mass for the purpose of receiving the said unit and its outer sealing-tube.

The said passage-tube 11, 12 is preferably made up of two parts, one part 11 which envelops the plug 5 being wider than the other part 12, the diameters of each part being sufficient to provide for the clearances which are necessary for the transverse deformations referred-to above.

Above the bell cap there is mounted the cable-winding device 13 or the like to which leads the cable 8, the said device being contained inside a fluid-tight casing 14.

The sealing-tube which is to be fitted between the walls of the passage-tube 11, 12 on the one hand and the walls of the unit constituted by the plug 5 and guide-tube 4 on the other hand is made up of two parts: one part 15 is adjacent to the tank 1 and is fixed or welded to this latter, while the part 16 confronts the first but has a larger diameter so as to provide a shoulder 16a for biological protection in combination with the plug 5.

A wide clearance is formed between the sealing-tube and the guide-tube in order to provide for transverse deformations of the combined unit, as shown in FIGS. 2 and 3. An annular centering bulge 17 can be formed at the bottom of the internal surface of the tube 15. There can additionally be provided above the said annular bulge 17 another annular centering bulge or enlargement 18 which is formed on the outer surface guide-tube 4 and which has a large clearance with respect to the sealing-tube 15 but which cannot pass through the annular bulge 17. An axial clearance is left between these two elements 17 and 18 so as to permit of the free expansions of the guide-tube and of the tank. Any accidental falling of the guide-tube inside the tank 1 is thus prevented.

A centering shaft-hole 19 can be provided for example at the top portion of the passage-tube 12 for the purpose of centering the lower sealing-tube 15 inside the said passage-tube.

The radial clearance between the upper sealing-tube 16 and the plug 5 must be small so as to offer the smallest possible passage for radiations.

Fluid-tightness is ensured at the top portion by means of a cover 20 which is fitted with O-ring seals $20_1$ and closes off the upper tube 16; the said cover provides passage at the centre thereof for the extended portion 9. Additional O-ring seals 21 are provided for sliding movement while at the same time ensuring fluid-tightness of the parts in contact.

The small diameter of the said extended portion 9 as compared with the diameter of the cover 20 reduces the friction forces which result (especially under the action of the O-ring seals 21) from the relative displacements of the two members 9 and 20 as a consequence of axial expansions and reduces the reactions produced on the tank as a result of such expansions, at the base or socket of the sealing-tube 15, 16.

It should be noted that the clearance between the passage 11 and upper sealing-tube 16 can be small, inasmuch as these parts are centered with respect to each other both at the bottom by means of the passage 19 and at the top by means of the centered couplings which successively connect the upper sealing-tube 16, the cover 20, the projection 9, the bell cap 10 and the passage-tube 11.

Means are preferably provided to permit the various parts of the unit which is thus constructed to be readily taken apart.

It accordingly follows that the projection 9 is fixed to the bell cap 10 by means of a retaining ring 22 or the like which can readily be removed. Similarly, the cover 20 is securely connected in the interior and in the end of the upper sealing-tube 16, also by means of a retaining ring 23 which can if necessary be manipulated through an orifice 24 which is normally closed by means of a plug 25.

Lastly, the assembly can also be completed by means for balancing at least partially the weight of the sealing-tube 15, 16, for example by means such as compensating spring 27.

The assembly as thus constructed operates as follows:

The creeping movements or transverse displacements of the tank 1 with respect to the plug 5 are made possible by virtue of the deformability by bending of the thin tube 15, and by virtue also of the clearance provided between the said tube and the guide-tube 4. It can be seen in FIG. 3 that the thin tube 15 is capable of being deformed transversely by assuming curves which are compatible with the elastic deformation permitted, while the assembly comprising the guide-tube 4 and its plug 5 can also be deformed transversely in a broken line by virtue of the knuckle-joint 6 and the annular centering bulge 17.

This method prevents dangerous torques, shearing stresses or punching efforts from being applied on the tank 1 at the neck 17 of the lower sealing-tube 15. The said tank can accordingly be designed to withstand only the hydrostatic pressure of the liquid which it contains. Moreover, the processes of expansion in the axial direction (shown in the vertical direction in the drawings) can take place freely, while giving rise to a sliding movement of the cover 20 on the extended portion 9; this sliding movement is accompanied only by small friction forces by reason of the small diameter of the extended portion 9.

The combined assembly can be readily dismantled. When proceeding to carry out this dismantling operation, the rod-operating device 13, 14 is first removed, then the unit constituted by the plug 5 and guide-tube 4 is suspended, for example, by a top ring 26 designed for the purpose of attachment to a lifting device, not shown. The rings or segments 22 are then removed as well as the bell cap 10.

After detachment of the retaining ring 23, it only remains to lift the unit comprising the plug 5 and guide-tube 4 together with the cover 20.

The tube which could be required for the purpose of guiding the control rod 3 in the interior of the tank has not been illustrated in the drawings. A guiding tube of this type can be secured either to the tank or preferably to the guide-tube 4.

The solution which has been illustrated, with a guide-tube which is only centered at the bottom portion thereof, is not exclusive or limitative, and it would also be feasible to devise a means of fitting the guide-tube 4 into the base of the lower sealing-tube 15.

In the latter case there would be provided connecting means between the guide-tube and the plug 5 which would admit not only of a pivotal movement but also of transverse sliding movements.

As a consequence of the above, and irrespective of the form of embodiment adopted, it is possible to construct a unit which operates in a manner sufficiently explained by the foregoing to make it unnecessary to labour the subject further, and which is characterized by a number of advantages as compared with prior art means of the type referred-to above, and in particular the following:

The advantage of preventing any undesirable extraneous reaction on the tank;

The advantage of permitting the various processes of expansion to take place without thereby causing damage to the various elements of the said unit;

The advantage of ensuring perfect biological protection; and

The additional advantage of permitting easy dismantling.

What we claim is:

1. A device providing fluid-tight access of a movable member through a structure to a fluid-tight tank mounted in spaced relation for limited displacement relative thereto, comprising: a sealing tube extending through said structure and connected at the inner end thereof to said tank, said sealing tube being deformable so as to permit limited relative displacement of said tank and said structure, and a tubular guiding unit enclosed within said sealing tube in spaced relation thereto, said guiding unit including a rigid upper portion and a rigid lower portion, the lower end of said upper portion and the upper end of said lower portion being pivotally connected together by a knuckle joint, the upper end of said upper portion of said guiding unit extending in sealed, sliding engagement through the outer end of said sealing tube and with the lower end of said lower portion of said guiding unit extending through said inner end of said sealing tube for slidably receiving therein said movable member to be moved into and out of said tank, said guiding unit being supported adjacent the outer end thereof by said structure, said device permitting limited, substantially unrestrained, relative displacement of said tank and said structure.

2. In a liquid moderator, pressure tube nuclear reactor having a fluid-tight tank for said moderator confined within a fixed biological protection shield structure, a device for providing fluid-tight access of a movable member through the protection shield structure to the fluid-tight tank mounted in spaced relation for limited displacement relative to the protection shield structure, comprising: a sealing-tube extending through said structure and connected at the inner end thereof to said tank, said sealing-tube being deformable so as to permit limited relative displacement of said tank and said structure; a rigid, articulated, tubular guiding unit enclosed within said sealing tube in spaced relation thereto, with the outer end of said guiding unit extending in sealed, sliding engagement through the outer end of said sealing tube and with the inner end thereof extending through said inner end of said sealing tube for slidably receiving therein said movable member to be moved into and out of said tank; said guiding unit comprising a rigid upper portion disposed within said structure; a rigid lower portion extending downwardly from said upper portion; and a knuckle joint pivotally connecting said upper and said lower portions together, the lower end portion of said guiding tube being movable with said deformable sealing-tube for substantially unrestrained movement therewith, said device permitting limited, substantially unrestrained, relative displacement of said tank and said structure; and a bell cap mounted on said structure covering and sealing the outer end of said device.

3. A device providing fluid-tight access of a movable member through a structure to a fluid-tight tank mounted in spaced relation for limited displacement relative thereto, comprising: a sealing tube extending through said structure and connected at the inner end thereof to said tank, said sealing tube being deformable so as to permit limited relative displacement of said tank and said structure; and a tubular guiding unit enclosed within said sealing tube in spaced relation thereto with the outer end of said guiding unit extending in sealed sliding engagement through the outer end of said sealing tube and with the inner end thereof extending through said inner end of said sealing tube for slidably receiving therein said movable member to be moved into and out of said tank, said guiding unit comprising an upper portion in the form of a plug suspended from adjacent the upper end thereof from the structure and a lower portion in the form of a guide tube coupled to said plug by means of a universal joint, said sealing tube including a first portion which surrounds said guide tube with a predetermined clearance and a second portion in which said plug is fitted, said device permitting limited, substantially unrestrained, relative displacement of said tank and structure.

4. A device in accordance with claim 3, wherein said plug has a body portion having a cross section which is larger than that of the lower portion of the guide-tube, and has an upwardly extended portion of smaller cross-section that that of the body of said plug and forming the upper end of said plug.

5. A device in accordance with claim 4, in which said structure is formed with a passage receiving said device, said passage being covered and sealed by a bell cap carried by and forming a part of the structure.

6. A device in accordance with claim 3, wherein an annular bulge for
centering the guide-tube is formed on the inner surface of said sealing-tube in proximity to the point of junction of the said sealing-tube and the tank.

7. A device providing fluid-tight access of a movable member through a structure to a fluid-tight tank mounted in spaced relation for limited displacement relative thereto, comprising: a sealing tube extending through said structure and connected at the inner end thereof to said tank, said sealing tube being deformable so as to permit limited relative displacement of said tank and said structure; a resilient device interposed between said structure and said sealing tube which is mounted vertically to bias said sealing tube in a direction away from said tank to transfer a part at least of the weight of said sealing tube to said structure; and a tubular guiding unit enclosed within said sealing tube in spaced relation thereto, with the outer end of said guiding unit extending in sealed, sliding engagement through the outer end of said sealing tube and with the inner end thereof extending through said inner end of said sealing tube for slidably receiving therein said movable member to be moved into and out of said tank, said device permitting limited, substantially unrestrained, relative displacement of said tank and said structure.

8. A device providing fluid-tight access of a movable member through a structure to a fluid-tight tank mounted in spaced relation for limited displacement relative thereto, comprising: a sealing tube extending through said structure and connected at the inner end thereof to said tank, said sealing tube being deformable so as to permit limited relative displacement of said tank and said structure and being formed on the inner surface thereof adjacent to the point of juncture of said sealing tube and said tank with an annular centering bulge; and a tubular guiding unit enclosed within said sealing tube in spaced relation thereto, with the outer end of said guiding unit extending in sealed, sliding engagement through the outer end of said sealing tube and with the inner end thereof extending through said inner end of said sealing tube for slidably receiving therein said movable member to be moved into and out of said tank, said guiding unit being supported adjacent the outer end thereof by said structure and being formed on the outer surface thereof at a point spaced above but adjacent to said annular centering bulge with an annular enlargement greater in external diameter than the internal diameter of said centering bulge, said device permitting limited, substantially unrestrained, relative displacement of said tank and said structure.

References Cited by the Examiner

UNITED STATES PATENTS

| 2,379,577 | 7/1945 | Harsted | 189—26 |
| 2,823,771 | 2/1958 | Langheck | 189—26 |
| 2,863,815 | 12/1958 | Moore et al. | 204—193.2 |
| 2,917,228 | 12/1959 | Lewis et al. | 285—231 |
| 2,984,609 | 5/1961 | Dickson et al. | 176—29 |
| 3,000,728 | 9/1961 | Long et al. | 204—193.2 |
| 3,073,771 | 1/1963 | Moulin | 176—27 |

FOREIGN PATENTS

| 1,206,226 | 2/1960 | France. |
| 1,079,228 | 4/1960 | Germany. |
| 821,655 | 10/1959 | Great Britain. |
| 821,931 | 10/1959 | Great Britain. |
| 583,283 | 10/1958 | Italy. |

REUBEN EPSTEIN, *Primary Examiner.*